(12) United States Patent
McDaniel

(10) Patent No.: US 11,844,334 B1
(45) Date of Patent: Dec. 19, 2023

(54) VIBRATORY ANIMAL FEEDER

(71) Applicant: Kenneth McDaniel, Newellton, LA (US)

(72) Inventor: Kenneth McDaniel, Newellton, LA (US)

( * ) Notice: Subject to any disclaimer, the term of this patent is extended or adjusted under 35 U.S.C. 154(b) by 197 days.

(21) Appl. No.: 17/385,187

(22) Filed: Jul. 26, 2021

(51) Int. Cl.
*A01K 5/02* (2006.01)
*F16M 11/26* (2006.01)

(52) U.S. Cl.
CPC .......... *A01K 5/0225* (2013.01); *F16M 11/26* (2013.01)

(58) Field of Classification Search
CPC .. A01K 5/0225; A01K 5/0233; A01K 5/0241; A01K 5/0258; A01K 5/0275; A01K 5/0291; F16M 11/26
See application file for complete search history.

(56) References Cited

U.S. PATENT DOCUMENTS

| | | | |
|---|---|---|---|
| 920,865 A * | 5/1909 | Hannible | A01K 5/0241 |
| | | | 119/902 |
| 1,430,405 A * | 9/1922 | Gottlieb | A01K 39/014 |
| | | | 116/67 R |
| 3,353,713 A * | 11/1967 | Scott | G01G 19/22 |
| | | | 222/58 |
| 4,565,159 A | 1/1986 | Sweeney | |
| 4,722,300 A | 2/1988 | Walker et al. | |
| 5,044,318 A | 9/1991 | Sutton et al. | |
| 5,230,300 A * | 7/1993 | Mezhinsky | A01K 5/0291 |
| | | | 119/51.11 |
| 5,474,027 A * | 12/1995 | Pollock | B65G 19/16 |
| | | | 119/57.4 |
| 5,735,231 A * | 4/1998 | Terenzi | A01K 5/0291 |
| | | | 119/51.11 |
| 6,082,300 A | 7/2000 | Futch | |
| 6,578,517 B2 * | 6/2003 | Borries | A01K 5/0233 |
| | | | 119/57.91 |
| 8,096,265 B1 * | 1/2012 | Wisecarver | A01K 5/0225 |
| | | | 119/56.2 |
| 8,651,052 B1 | 2/2014 | Dugan et al. | |
| 10,653,111 B2 | 5/2020 | Alcoser et al. | |
| 10,743,518 B2 | 8/2020 | Knight | |
| 10,842,127 B2 | 11/2020 | Landry | |
| 11,167,942 B2 * | 11/2021 | Ambrose | B65G 69/08 |
| 11,602,127 B1 * | 3/2023 | Swicegood | A01K 5/0291 |
| 2005/0076843 A1 * | 4/2005 | Ansaldo | A01K 5/0225 |
| | | | 119/57.91 |

(Continued)

*Primary Examiner* — Ebony E Evans
(74) *Attorney, Agent, or Firm* — R. Keith Harrison

(57) ABSTRACT

A vibratory animal feeder suitable for containing and agitating particulate animal feed and preventing or minimizing bridging and facilitating flow of the feed as the feed is dispensed to attract game animals may include a feeder hopper. The feeder hopper may include a hopper interior for containing animal feed and a feed dispensing opening communicating with the hopper interior. A feed dispensing assembly may be disposed in communication with the feed dispensing opening of the feed hopper. At least one hopper vibrator may be disposed in the hopper interior in mechanical engagement with the feeder hopper to impart vibration to the feeder hopper and agitate and break up the animal feed such that the animal feed flows more easily and freely from the feeder to the ground or other surface.

10 Claims, 8 Drawing Sheets

(56) References Cited

U.S. PATENT DOCUMENTS

| | | | |
|---|---|---|---|
| 2009/0241845 A1* | 10/2009 | Croft | A01K 5/02 |
| | | | 119/51.01 |
| 2012/0037079 A1* | 2/2012 | Rasmussen | A01K 5/0225 |
| | | | 119/52.3 |
| 2014/0103148 A1* | 4/2014 | Wisecarver | A01K 5/0225 |
| | | | 239/681 |

* cited by examiner

VIBRATORY ANIMAL FEEDER

FIELD

Illustrative embodiments of the disclosure generally relate to animal feeders. More particularly, illustrative embodiments of the disclosure relate to a vibratory animal feeder which is suitable for containing and agitating particulate animal feed and preventing or minimizing bridging and facilitating flow of the feed as the feed is dispensed to attract game animals.

SUMMARY

Illustrative embodiments of the disclosure are generally directed to a vibratory animal feeder suitable for containing and agitating particulate animal feed and preventing or minimizing bridging and facilitating flow of the feed as the feed is dispensed to attract game animals. An illustrative embodiment of the vibratory animal feeder may include a feeder hopper. The feeder hopper may include a hopper interior for containing animal feed and a feed dispensing opening communicating with the hopper interior. A feed dispensing assembly may be disposed in communication with the feed dispensing opening of the feed hopper. At least one hopper vibrator may be disposed in the hopper interior in mechanical engagement with the feeder hopper to impart vibration to the feeder hopper and agitate and break up the animal feed such that the animal feed flows more easily and freely from the feeder to the ground or other surface.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
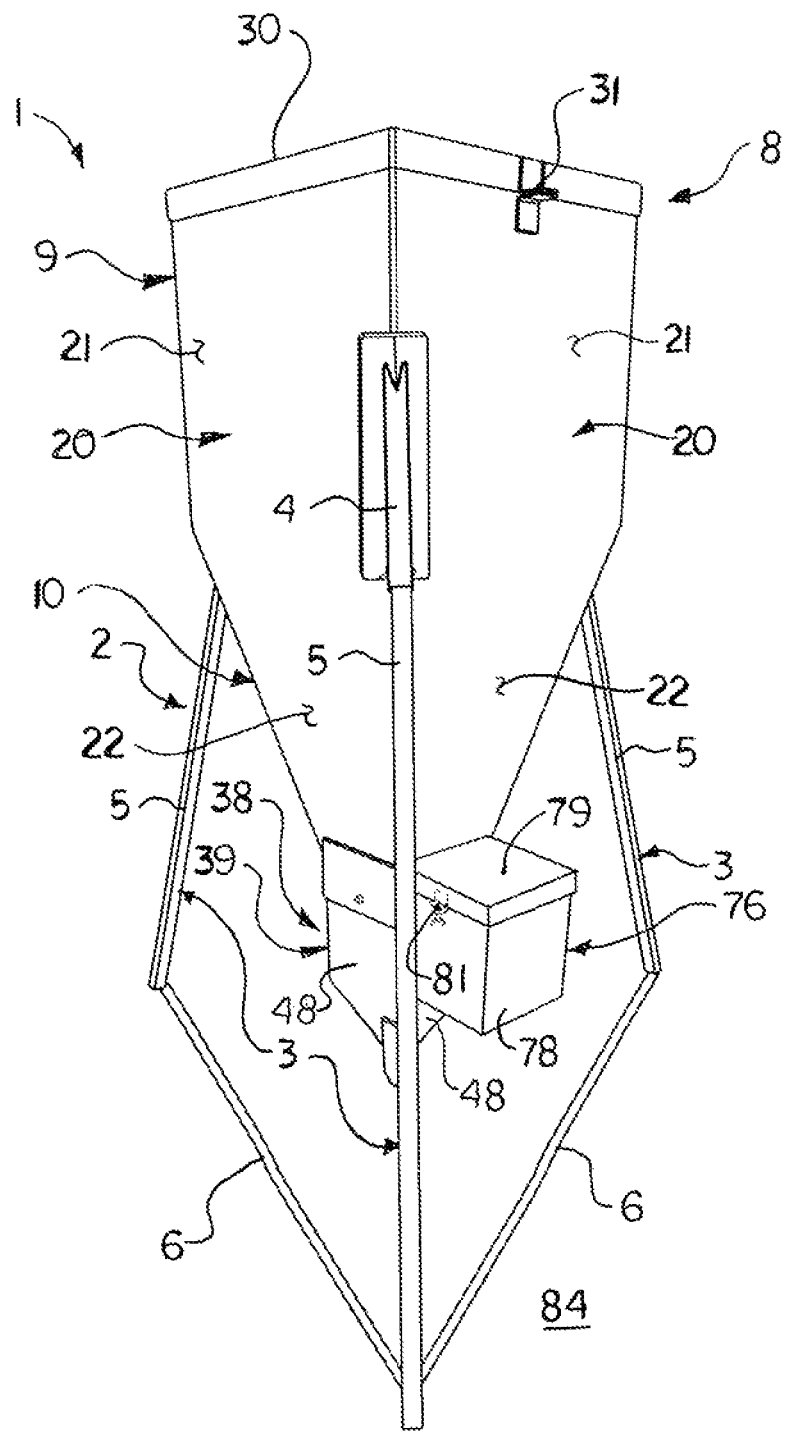
FIG. 1 is a rear perspective view of an illustrative embodiment of the vibratory animal feeder.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-8 of the drawings, an illustrative embodiment of the vibratory animal feeder is generally indicated by reference numeral 1. As will be hereinafter described, the vibratory animal feeder 1 may be suitably configured to contain and dispense a supply of animal feed, particularly a fine particulate animal feed such as rice bran, for example and without limitation, while preventing or minimizing bridging of the feed inside and facilitating free flow of the feed from the vibratory animal feeder 1. Accordingly, the vibratory animal feeder 1 may facilitate flow and efficiently dispense substantially the entire quantity of animal feed from the vibratory animal feeder 1 without the need for an operator to periodically manually loosen, dislodge or agitate the animal feed for the purpose.

Figure 6:
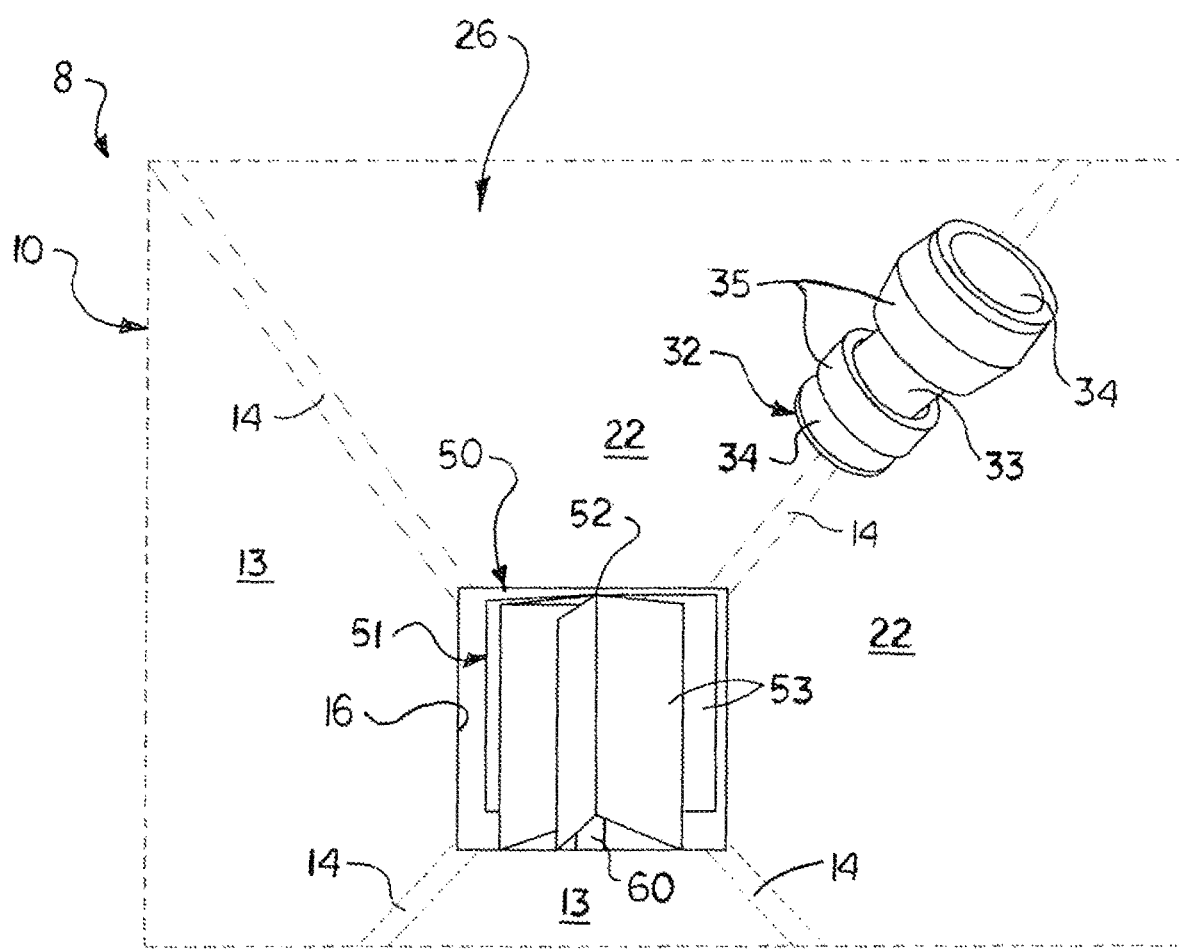
FIG. 6 is an interior view of the hopper funnel of the vibratory animal feeder, more particularly illustrating a typical feed dispensing assembly in the hopper funnel and a hopper vibrator in the hopper funnel above the feed dispensing assembly.

The vibratory animal feeder 1 may include a feeder hopper 8. As illustrated in FIG. 6, the feeder hopper 8 may have a hopper interior 26. A feed dispensing opening 16 may communicate with the hopper interior 26. A feed dispensing assembly 50 may be disposed in communication with the feed dispensing opening 16. At least one hopper vibrator 32 may be disposed in the hopper interior 26 in mechanical engagement with the feed hopper 8. Accordingly, in typical application of the vibratory animal feeder 1, a supply of the animal feed may be placed in the hopper interior 26 of the feeder hopper 8. The feed dispensing assembly 50 may be operated to agitate and dispense the animal feed from the hopper interior 26 through the feed dispensing opening 16. The hopper vibrator 32 may be operated to impart vibration to the feeder hopper 8. The vibrations may further agitate the animal feed and prevent or minimize bridging of the animal feed in the hopper interior 26 to enhance flow of the animal feed from the hopper interior 26 through the feed dispensing opening 16.

The hopper vibrator 32 (FIG. 6) may have any design which is suitable for imparting vibration to the feeder hopper 8. Accordingly, in some embodiments, the hopper vibrator 32 may include at least one typically battery-powered vibrator motor 33. The vibrator motor 33 may operate at 12 VDC @ 1,800 RPM, for example and without limitation. At least one, and typically, a pair of vibrator heads 34 may extend from the vibrator motor 33. A resilient vibrator sleeve 35 may be provided on each vibrator head 34. The vibrator sleeves 35 may engage the interior surface of the feeder hopper 8.

Figure 3:
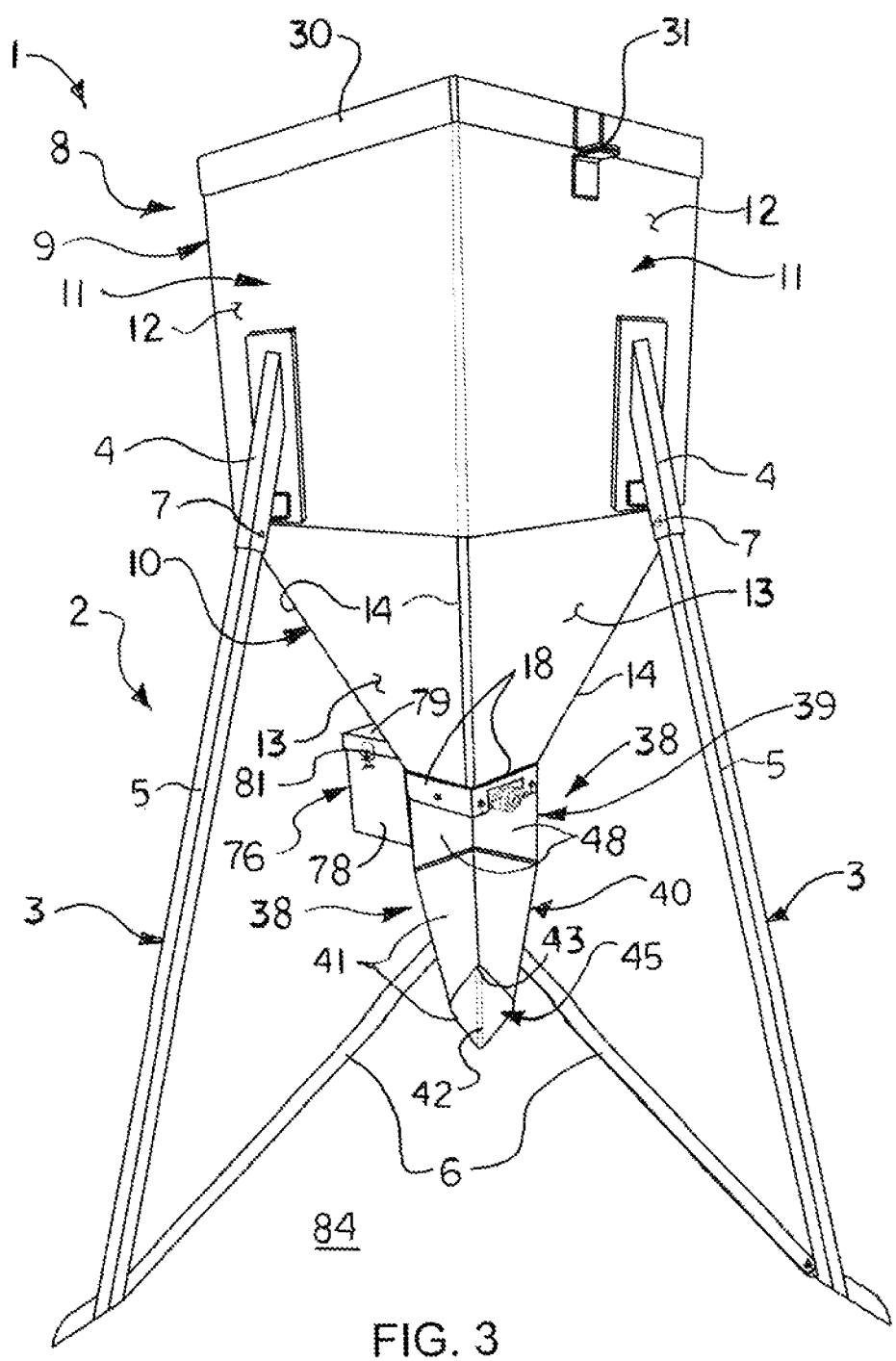
FIG. 3 is a front view of the vibratory animal feeder.
Figure 5:
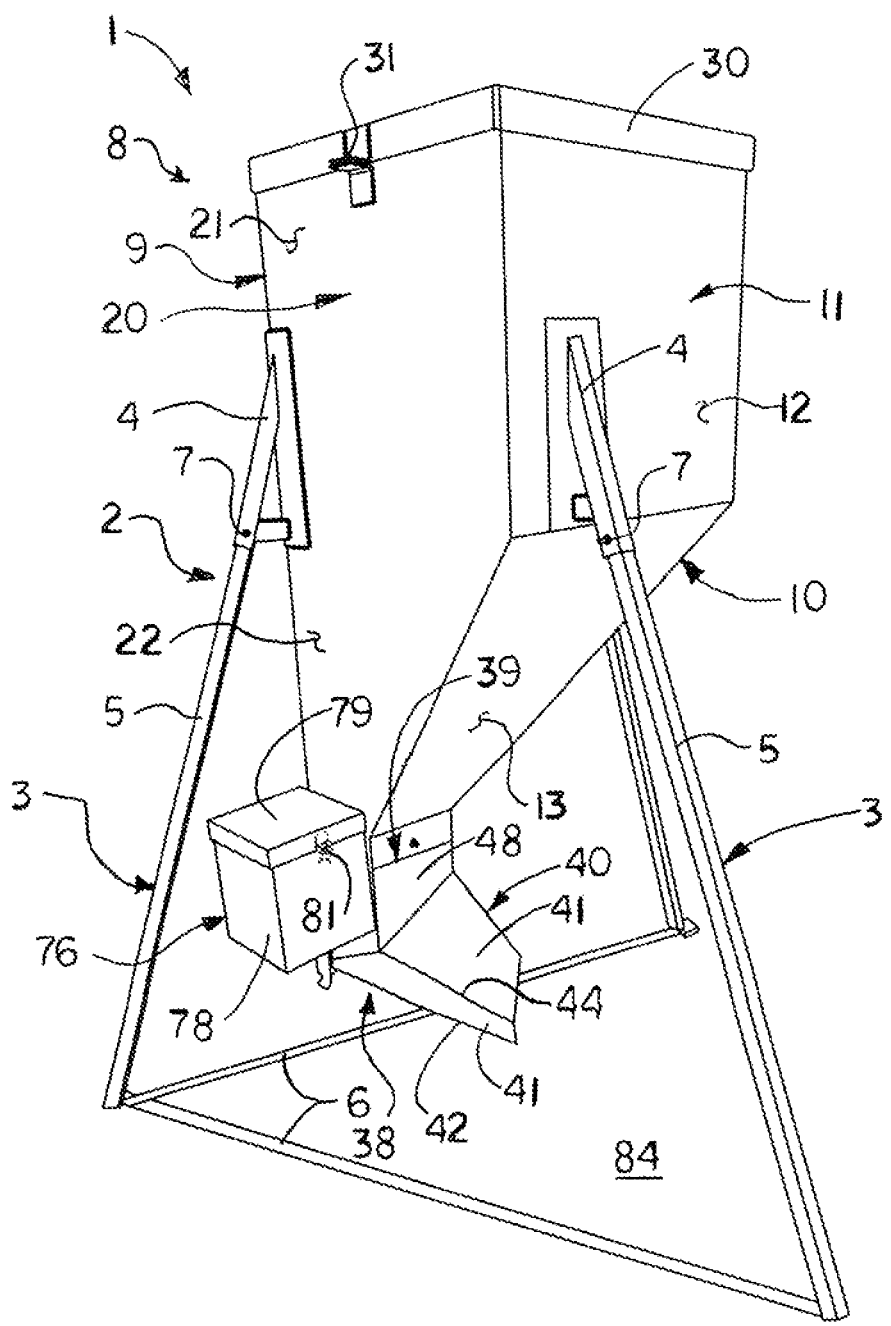
FIG. 5 is a right-side front perspective view of the illustrative vibratory animal feeder.

As illustrated in FIGS. 1, 3 and 5, in some embodiments, the feeder hopper 8 may include a hopper reservoir 9. A hopper funnel 10 may extend downwardly from the hopper reservoir 9. Accordingly, as illustrated in FIG. 6, the feed dispensing opening 16 may be provided in the lower portion of the hopper funnel 10. The hopper reservoir 9 may have a square cross section, whereas the hopper funnel 10 may be conical.

As illustrated in FIG. 3, the feeder hopper 8 may include a pair of front hopper walls 11 having a respective pair of vertical front reservoir panels 12 and a pair of inwardly angled front funnel panels 13 angling from the respective front reservoir panels 12. As illustrated in FIG. 1, a pair of rear hopper walls 20 may have a pair of vertical rear reservoir panels 21 which join and angle from the respective pair of front reservoir panels 12 of the front hopper walls 11 and a pair of vertical rear funnel panels 22 which extend from the respective rear reservoir panels 21.

The hopper reservoir 9 of the feeder hopper 8 may be formed by the vertical front reservoir panels 12 of the respective front hopper walls 11 and the vertical rear reservoir panels 21 of the respective rear hopper walls 20. The hopper funnel 10 of the feeder hopper 8 may be formed by the sloped front funnel panels 13 of the respective front hopper walls 11 and the vertical rear funnel panels 22 of the respective rear hopper walls 20.

As illustrated in FIG. 6, wall junction crevices 14 may be formed by and between the front funnel panels 13 and the rear funnel panels 22 of the hopper funnel 10. Each wall junction crevice 14 may communicate with the feed dispensing opening 16 at the bottom of the hopper funnel 10. Accordingly, each wall junction crevice 14 may define an animal feed flow path 15 for flow of the animal feed as it flows from the hopper interior 26 to the feed dispensing opening 16. In some embodiments, at least one hopper vibrator 32 may be disposed in at least one of the wall junction crevices 14 and in mechanical engagement with a corresponding adjacent pair of the front hopper walls 11 and/or the rear hopper walls 20. A removable hopper lid 30, typically having a hopper lid latch 31, may be provided on the hopper reservoir 9 of the feeder hopper 8.

Figure 2:
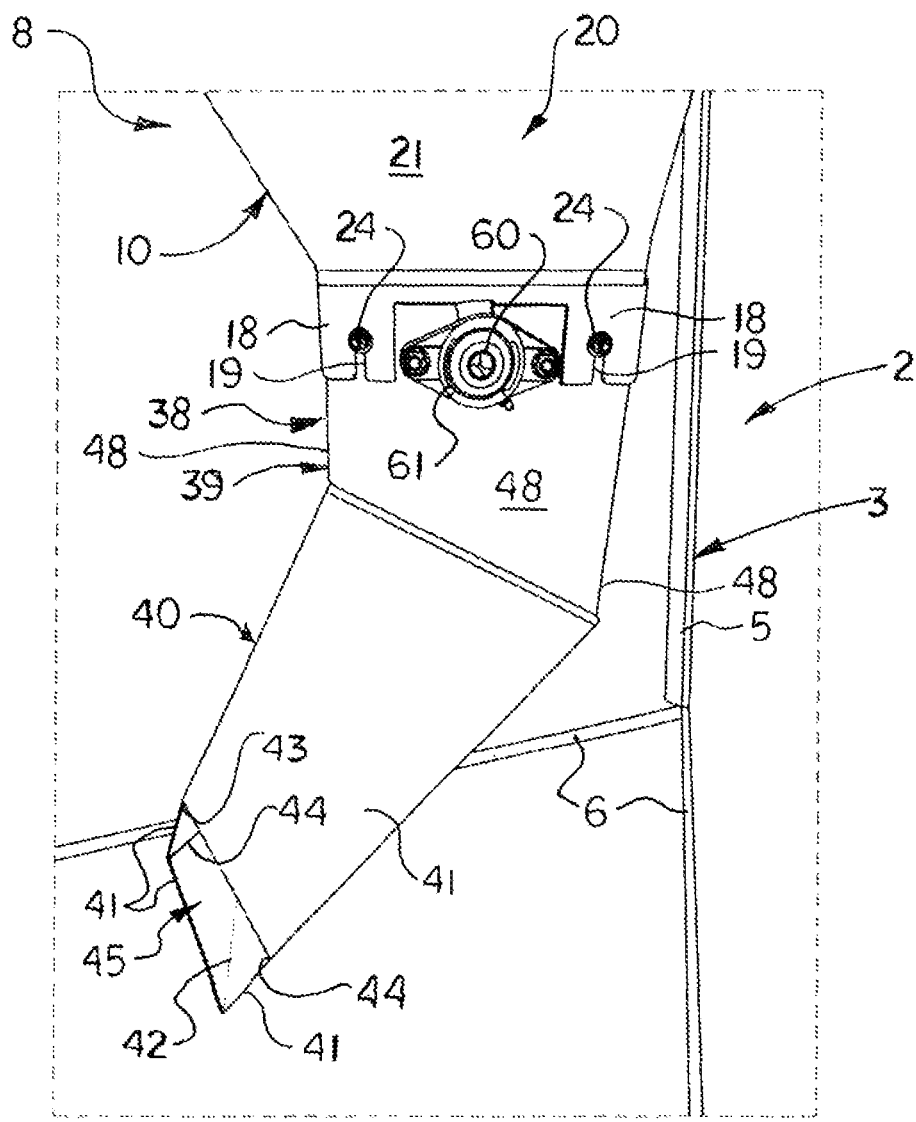
FIG. 2 is a left side perspective view of a typical feed dispensing spout for the vibratory animal feeder.

As illustrated in FIGS. 2, 3 and 5, in some embodiments, a feed dispensing spout 38 may communicate with the feed dispensing opening 16 of the hopper funnel 10. The feed dispensing spout 38 may facilitate smooth flow of the animal feed as the feed dispensing assembly 50 dispenses the animal feed from the hopper interior 26 through the feed dispensing opening 16.

As illustrated in FIG. 2, the feed dispensing spout 38 may include a receiving portion 39 which communicates with the feed dispensing opening 16 and a dispensing portion 40 which extends from the receiving portion 39. The receiving portion 39 of the feed dispensing spout 38 may extend from the lower portion of the hopper funnel 10 and may be oriented substantially vertically. The dispensing portion 40 of the feed dispensing spout 38 may be oriented at an obtuse angle with respect to the receiving portion 39.

In some embodiments, the receiving portion 39 of the feed dispensing spout 38 may include multiple receiving portion walls 48. The receiving portion walls 48 of the receiving portion 39 may correspond in number and position to the respective front funnel panels 13 and rear funnel panels 22 of the hopper funnel 10. In like manner, the dispensing portion 40 of the feed dispensing spout 38 may include multiple dispensing portion walls 41. The dispensing portion walls 41 of the dispensing portion 40 may correspond in number and position to the respective receiving portion walls 48 of the receiving portion 39. As illustrated in FIGS. 2 and 3, in some embodiments, the dispensing portion walls 41 may join at a bottom spout crease 42, a top spout crease 43 and a pair of side spout creases 44. The dispensing portion walls 41 may form a terminal spout opening 45 at the extending end of the dispensing portion 40 of the feed dispensing spout 38.

In some embodiments, the feed dispensing spout 38 may be detachably attached to the hopper funnel 10 of the feeder hopper 8 according to the knowledge of those skilled in the art, typically for purposes which will be hereinafter described. Accordingly, as illustrated in FIG. 2, funnel flanges 18 may extend downwardly from the lower end of the hopper funnel 10. The funnel flanges 18 may be suitably sized and configured to receive the upper end of the receiving portion 39 of the feed dispensing spout 38. Flange slots 19 may extend into each funnel flange 18. At least one spout fastener 24 may attach the receiving portion 39 of the feed dispensing spout 38 to each funnel flange 18 at each flange slot 19.

The feed dispensing assembly 50 (FIG. 6) may have any design which can facilitate agitation and breakup of the particulate animal feed in the hopper interior 26 of the feeder hopper 8 and prevent or minimize bridging of the animal feed to facilitate smooth flow of the animal feed from the hopper interior 26 through the feed dispensing opening 16. Accordingly, as illustrated in FIG. 6, in some embodiments, the feed dispensing assembly 50 may include at least one feed dispensing wheel 51 disposed in communication with the feed dispensing opening 16. In some embodiments, the feed dispensing wheel 51 may have a paddlewheel design and may include a wheel hub 52. Multiple wheel blades 53 may extend outwardly from the wheel hub 52 in spaced-apart relationship to each other. The feed dispensing wheel 51 may have any number of wheel blades 53. In some embodiments, the feed dispensing wheel 51 may have an auger design or other design which is consistent with the functional requirements of the feed dispensing assembly 50.

The rotational axis of the feed dispensing wheel 51 may be disposed typically below the feed dispensing opening 16. In some embodiments, the rotational axis of the feed dispensing wheel 51 may be disposed within or above the feed dispensing opening 16.

Figure 4:
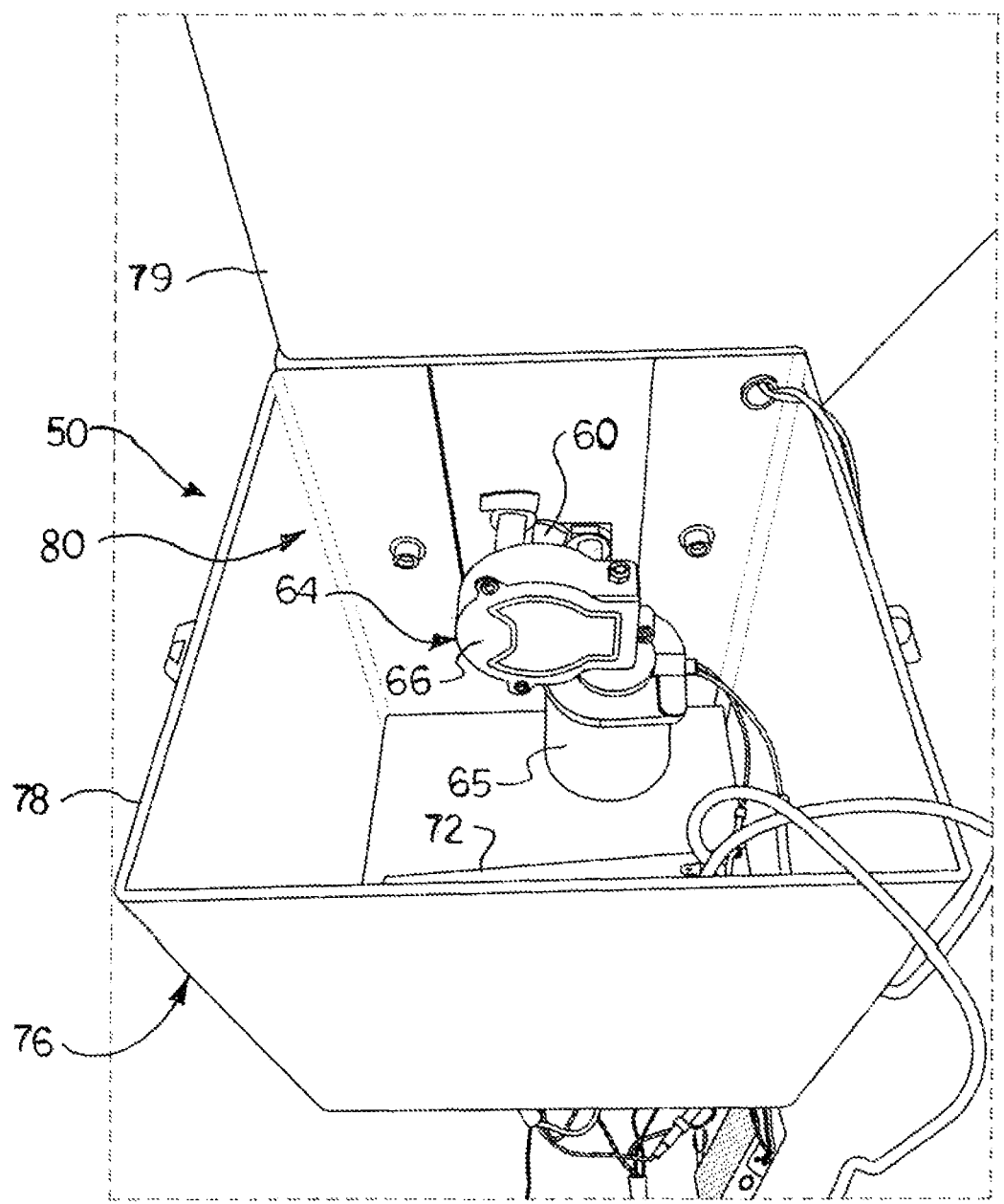
FIG. 4 is a perspective view of a typical motor box of the vibratory animal feeder in an open position, with a shaft motor assembly, a dispensing assembly drive shaft drivingly engaged by the shaft motor assembly and a battery in the motor box.

A drive shaft 60 may drivingly engage the wheel hub 52 of the feed dispensing wheel 51 for rotation of the feed dispensing wheel 51. As illustrated in FIG. 4, a wheel drive assembly 64 may drivingly engage the drive shaft 60 for rotation. The wheel drive assembly 64 may include a drive motor 65. The drive motor 65 may drivingly engage the drive shaft 60 through the gear box 66. In some embodiments, the wheel drive assembly 64 may include a right angle drive worm gear having 13.5 VDC @ 50 RPM, with 60 watts rated torque load, for example and without limitation. As illustrated in FIG. 4, at least one battery 72 may provide a source of electrical current to the drive motor 65. Other types of drive motors 65 having different operational specs may be suitable for the purpose.

In some embodiments, a timer (not illustrated) may operationally interface with the drive motor 65. The timer may be operable or programmable to operate the drive motor 65 at selected times and/or time intervals.

The drive shaft 60 may extend through aligned drive shaft openings (not illustrated) typically in the opposite receiving portion walls 48 of the receiving portion 39 of the feed dispensing spout 38. As illustrated in FIG. 2, a shaft bearing 61 may be provided typically on the exterior surface of each of the receiving portion walls 48. The drive shaft 60 may extend through the shaft bearing 61. The feed dispensing assembly 50 in the hopper interior 26 (FIG. 6) may be accessed for maintenance and/or replacement, as deemed necessary, by selectively detaching the feed dispensing spout 38 from the hopper funnel 10 typically after removing the spout fasteners 24 (FIG. 2) and detaching the feed dispensing spout 38 from the hopper funnel 10.

Figure 7:
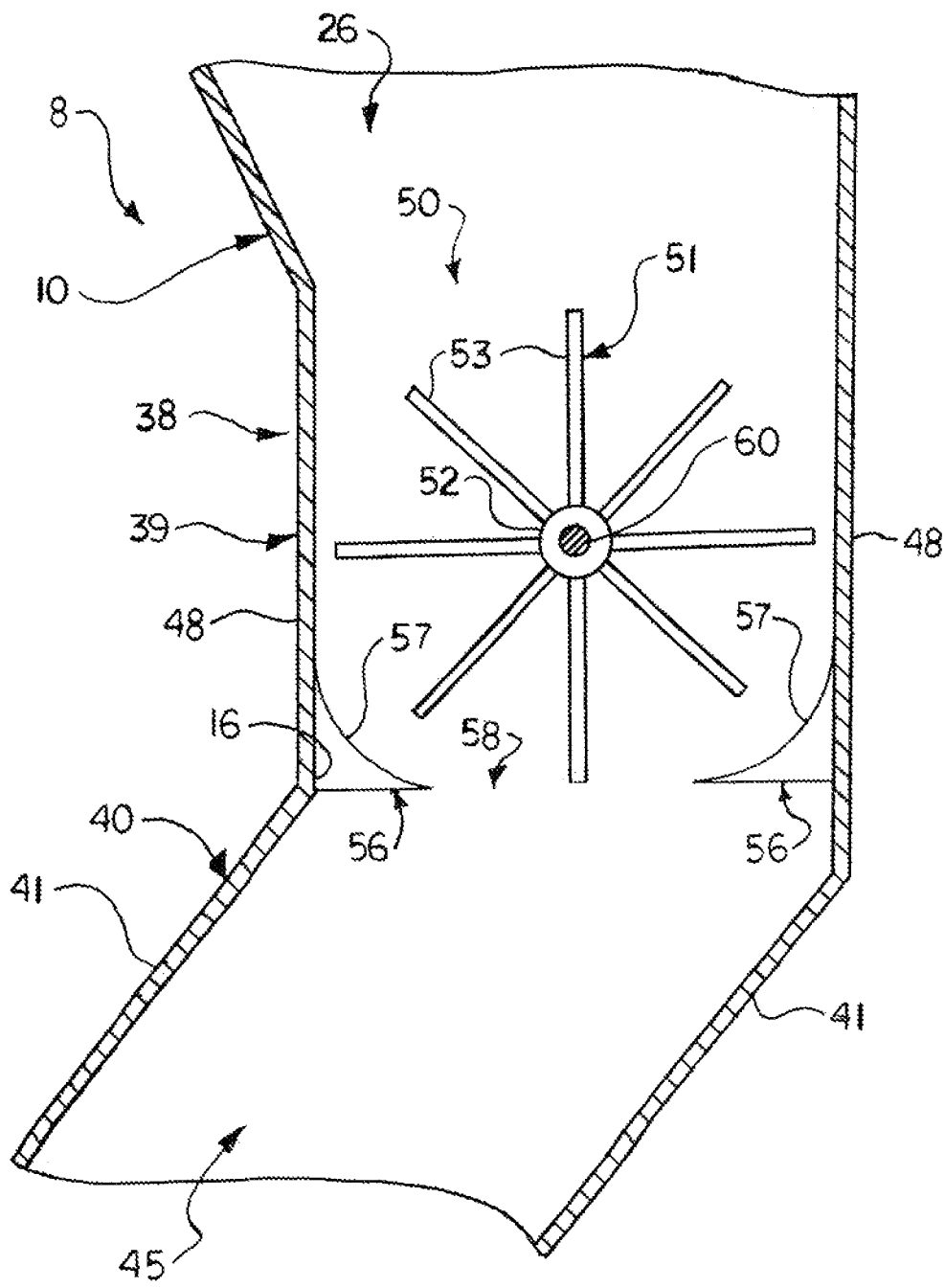
FIG. 7 is a sectional view of the lower portion of the hopper funnel and the feed dispensing spout, more particularly illustrating a pair of damper flaps disposed in the feed dispensing opening beneath the feed dispensing wheel of the feed dispensing assembly.
Figure 8:
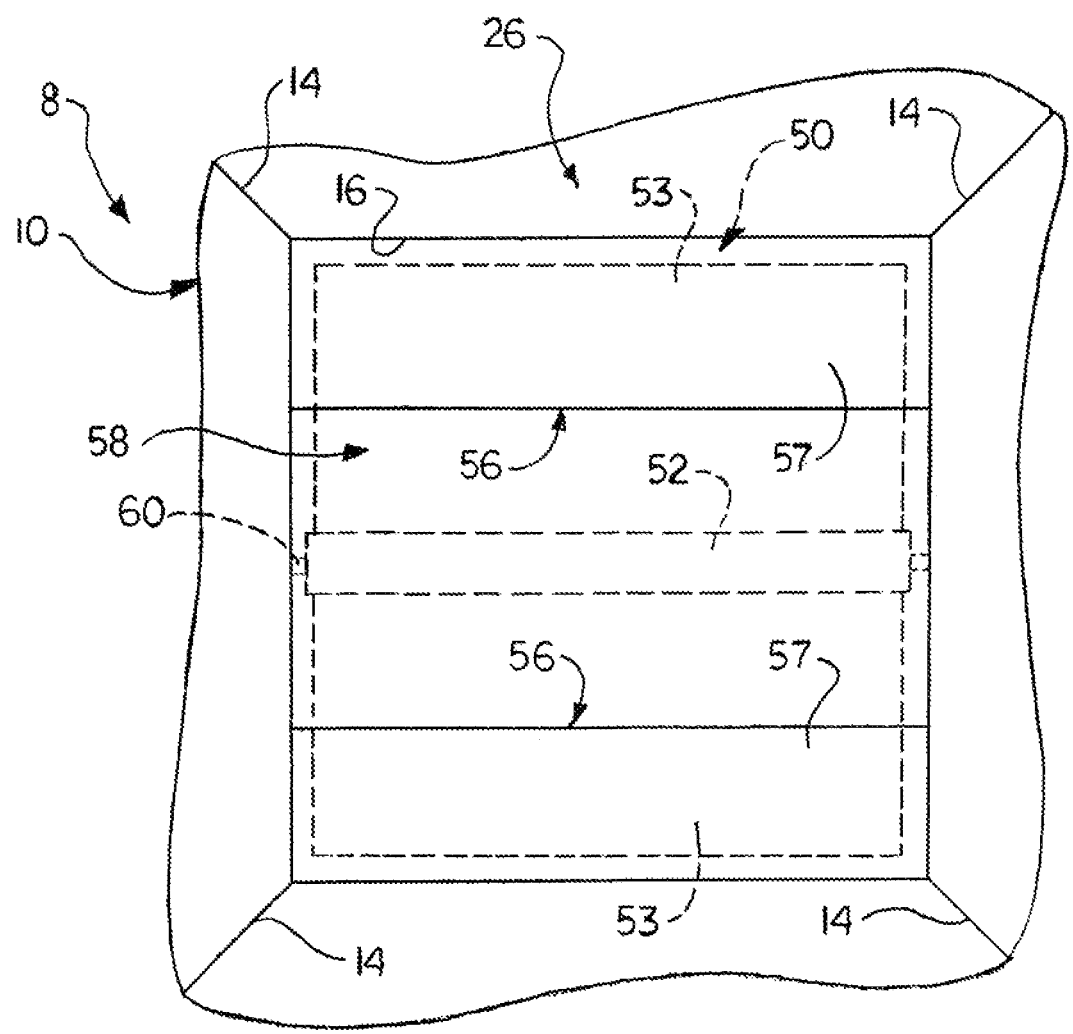
FIG. 8 is a top view of the damper flaps illustrated in FIG. 7.

As illustrated in FIGS. 7 and 8, in some embodiments, at least one, and typically, a pair of spaced-apart damper flaps 56 may be disposed in the hopper interior 26 typically beneath the feed dispensing wheel 51 of the feed dispensing assembly 50. In some embodiments, the damper flaps 56 may be disposed within, above or beneath the feed dispensing opening 16. A damper flap opening 58 may be formed by and between the damper flaps 56. As illustrated in FIG. 7, each damper flap 56 may have a damper flap surface 57 which faces the feed dispensing wheel 51. In some embodiments, the damper flap surface 57 of each damper flap 56 may be concave, as illustrated. In some embodiments, the damper flap surface 57 may be angled downwardly from a corresponding receiving portion wall 48 in the receiving portion 39 of the feed dispensing spout 38 to the damper flap opening 58. The damper flaps 56 may prevent the animal feed from inadvertently falling between the wheel blades 53 of the feed dispensing wheel 51 as the animal feed is dispensed from the dispensing portion 40 of the feed dispensing spout 38.

In some embodiments, a motor box 76 may be provided on the feeder hopper 8. Accordingly, as illustrated in FIG. 4, the wheel drive assembly 64 and the battery 72 may be contained in the motor box 76. The motor box 76 may include a box base 78 having a box interior 80. The wheel drive assembly 64 and the battery 72 may be contained in the box interior 80. The box base 78 may be attached to the hopper funnel 10 and/or to the receiving portion 39 of the feed dispensing spout 38 typically using fasteners suitable for the purpose. A box lid 79 may be pivotally or removably attached to the box base 78. As illustrated in FIG. 3, a latch 81 may be provided on the box lid 79 to facilitate selective closing and securing or locking of the box lid 79 on the box base 78.

In some embodiments, a feeder stand 2 may support the feeder hopper 8 in an elevated position above the ground or other support area or surface 84. The feeder stand 2 may have any design or structure which is suitable for the purpose. Accordingly, in some embodiments, the feeder stand 2 may include multiple leg assemblies 3. Multiple leg stabilizers 6 may connect the leg assemblies 3. Each leg assembly 3 of the feeder stand 2 may be selectively adjustable in length. Accordingly, each leg assembly 3 may include a leg receptacle 4 attached to the feeder hopper 8. A leg shaft 5 may be telescopically extendable from the leg receptacle 4, such as via an adjusting pin 7 which is insertable through an adjustment opening in the leg receptacle 4 and through a registering one of multiple adjustment openings (not illustrated) in the leg shaft 5. Each leg stabilizer 6 may extend between each pair of adjacent leg shafts 5 of the leg assemblies 3.

In typical application of the vibratory animal feeder 1, the feeder stand 2 may be deployed on a flat section on the surface 84. Accordingly, the leg stabilizers 6 of the feeder stand 2 may lie flat on the surface 84 with the leg assemblies 3 extending upwardly therefrom. In some applications, the length of one or more of the leg assemblies 3 may be selectively adjusted to select the height of the feeder hopper 8 above the surface 84. This may be carried out typically by removing the adjusting pin 7, sliding the leg shaft 5 in the leg receptacle 4 of the corresponding leg assembly 3 and reinserting the adjusting pin 7 through the selective registering adjustment openings.

A supply of particulate animal feed (not illustrated) such as rice bran, for example and without limitation, may be placed in the hopper interior 26 (FIG. 6) of the feeder hopper 8. This may be accomplished by removing or opening the hopper lid 30 and pouring the animal feed from a feed container (not illustrated) into the hopper reservoir 9 of the feeder hopper 8. Accordingly, the animal feed may first fill the hopper funnel 10 and then the hopper reservoir 9 until the desired quantity of animal feed is placed in the hopper interior 26. The hopper lid 30 may then be closed on the feeder hopper 8 and locked via the hopper lid latch 31.

The drive motor 65 (FIG. 4) of the wheel drive assembly 64 may be operated to rotate the feed dispensing wheel 51 (FIG. 6) of the feed dispensing assembly 50. Accordingly, the drive motor 65 may rotate the drive shaft 60 typically through the gear box 66 of the wheel drive assembly 64. The wheel blades 53 of the feed dispensing wheel 51 may agitate or break up and allow the animal feed to fall through the feed dispensing opening 16 and typically then through the receiving portion 39 and the dispensing portion 40, respectively, of the feed dispensing spout 38. The animal feed may discharge through the spout opening 45 of the feed dispensing spout 38 onto the surface 84. The dispensed animal feed may therefore attract animals to the vibratory animal feeder 1 for hunting, observation or other purposes.

In some applications, the hopper vibrator 32 (FIG. 6) may be operated to impart vibration to the hopper funnel 10 of the feeder hopper 8. The vibration may agitate and break up the animal feed as well as prevent or minimize bridging of the animal feed in the hopper interior 26 of the feeder hopper 8 as the hopper vibrator 32 vibrates the hopper funnel 10. Additionally, as it flows along the wall junction crevices 14, the animal feed may directly contact the hopper vibrator 32 such that the hopper vibrator 32 enhances agitation and breaking up of the animal feed. Accordingly, the animal feed may flow more easily and freely along the wall junction crevices 14 and through the feed dispensing opening 16 and feed dispensing spout 38 to the surface 84.

In some embodiments, the animal feed may fall from the receiving portion 39 into the dispensing portion 40 of the feed dispensing spout 38 through the damper flap opening 58 (FIGS. 7 and 8) between the damper flaps 56. Accordingly, the damper flaps 56 may prevent the animal feed from inadvertently falling between the wheel blades 53 of the feed dispensing wheel 51 as the animal feed is dispensed from the dispensing portion 40 of the feed dispensing spout 38.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A vibratory animal feeder, comprising:
   a feeder hopper including:
   a plurality of hopper walls comprising a pair of front hopper walls having a pair of vertical front reservoir panels, respectively, and a pair of sloped front funnel panels angling from the pair of vertical front reservoir panels, respectively; a pair of rear hopper walls having a pair of vertical rear reservoir panels angling from the pair of front reservoir panels, respectively, of the pair of front hopper walls and a pair of vertical rear funnel panels extending from the pair of vertical rear reservoir panels, respectively, in straight and planar relationship to the pair of vertical rear reservoir panels, respectively; and wherein the feeder hopper is formed by the pair of sloped front funnel panels of the pair of front hopper walls, respectively, and the pair of vertical rear funnel panels of the pair of rear hopper walls, respectively; and the hopper reservoir is formed by pair of vertical front reservoir panels of the pair of front hopper walls, respectively, and the pair of vertical rear reservoir panels of the air of rear hopper walls, respectively;

a hopper funnel formed by the plurality of hopper walls;

a hopper reservoir formed by the plurality of hopper walls above the hopper funnel;

a hopper interior in the hopper funnel and the hopper reservoir, the hopper interior sized and configured to receive a supply of animal feed;

a plurality of wall junction crevices between the plurality of hopper walls in the hopper interior; and a feed dispensing opening formed by the plurality of hopper walls in the hopper funnel and communicating with the hopper interior, each of the plurality of wall junction crevices defining an animal feed flow path communicating with the feed dispensing opening in the hopper interior;

at least one damper flap disposed in the hopper interior; and a damper flap opening formed by the at least one damper flap:

a feed dispensing assembly disposed in communication with the damper flap opening of the feed hopper; and at least one hopper vibrator disposed in the hopper interior in the animal feed flow path of at least one of the plurality of wall junction crevices and in mechanical engagement with the plurality of hopper walls, whereby the at least one hopper vibrator is operable to impart vibration to the feed hopper and to contact, agitate and break up the animal feed such that flow of the animal feed from the hopper interior through the feed dispensing opening of the feeder hopper is enhanced.

2. The vibratory animal feeder of claim 1 wherein the hopper reservoir has a square cross-section and the hopper funnel is conical.

3. The vibratory animal feeder of claim 1 further comprising a feed dispensing spout communicating with the damper flap opening.

4. The vibratory animal feeder of claim 3 wherein the feed dispensing spout comprises a receiving portion communicating with the damper flap opening and a dispensing portion extending from the receiving portion.

5. The vibratory animal feeder of claim 1 further comprising a feeder stand, and wherein the feeder hopper is carried by the feeder stand.

6. The vibratory animal feeder of claim 5 wherein the feeder stand comprises a plurality of leg assemblies and a plurality of leg stabilizers connecting the plurality of leg assemblies.

7. The vibratory animal feeder of claim 6 wherein the plurality of leg assemblies comprises a plurality of leg receptacles carried by the feeder hopper and a plurality of leg shafts telescopically extendable from the plurality of leg receptacles, respectively, and the plurality of leg stabilizers extends between adjacent ones of the plurality of leg shafts.

8. A vibratory animal feeder, comprising:
a feeder hopper including:

a plurality of hopper walls;

a conical hopper funnel formed by the plurality of hopper walls;

a hopper reservoir formed by the plurality of hopper walls above the hopper funnel, the hopper reservoir having a square cross-section;

a hopper interior in the hopper funnel and the hopper reservoir, the hopper interior sized and configured to receive a supply of animal feed;

a plurality of wall junction crevices between the plurality of hopper walls in the hopper interior; and a feed dispensing opening formed by the plurality of hopper walls in the hopper funnel and communicating with the hopper interior, each of the plurality of wall junction crevices defining an animal feed flow path communicating with the feed dispensing opening in the hopper interior;

a pair of spaced-apart damper flaps disposed in the hopper interior; and a damper flap opening formed by the pair of spaced-apart damper flaps;

a feed dispensing assembly disposed in communication with the damper flap opening of the feed hopper, the feed dispensing assembly including:

a feed dispensing wheel having a plurality of wheel blades:

a drive shaft drivingly engaging the feed dispensing wheel; and a wheel drive assembly drivingly engaging the drive shaft for rotation;

at least one hopper vibrator disposed in the hopper interior in the animal feed flow path of at least one of the plurality of wall junction crevices and in mechanical engagement with the plurality of hopper walls, whereby the at least one hopper vibrator is operable to impart vibration to the feed hopper and to contact, agitate and break up the animal feed such that flow of the animal feed from the hopper interior through the feed dispensing opening of the feeder hopper is enhanced; and a feed dispensing spout communicating with the damper flap opening, the feed dispensing spout having a receiving portion communicating with the damper flap opening and a dispensing portion extending from the receiving portion.

9. The vibratory animal feeder of claim 8 further comprising a motor box carried by the feeder hopper, and wherein the wheel drive assembly is contained in the motor box.

10. A vibratory animal feeder, comprising:
a feeder hopper including:

a plurality of hopper walls comprising a pair of front hopper walls having a pair of vertical front reservoir panels, respectively, and a pair of sloped front funnel panels angling inwardly from the pair of vertical front reservoir panels, respectively; a pair of rear hopper walls having a pair of vertical rear reservoir panels angling from the pair of front reservoir panels, respectively, of the pair of front hopper walls and a pair of vertical rear funnel panels extending from the pair of vertical rear reservoir panels, respectively, in straight and planar relationship to the pair of vertical rear reservoir panels, respectively; and wherein the feeder hopper is formed by the pair of sloped front funnel panels of the pair of front hopper walls, respectively, and the pair of vertical rear funnel panels of the pair of rear hopper walls, respectively; and the hopper reservoir is formed by pair of vertical front reservoir panels of the pair of front hopper walls, respectively, and the pair of vertical rear reservoir panels of the pair of rear hopper walls, respectively;

a conical hopper funnel formed by the plurality of hopper walls;

a hoper reservoir formed by the plurality of hoper walls above the hopper funnel, the hopper reservoir having a square cross-section;

a hopper interior in the hopper funnel and the hoper reservoir, the hopper interior sized and configured to receive a supply of animal feed;

a plurality of wall junction crevices between the plurality of hopper walls in the hopper interior; and a feed dispensing opening formed by the plurality of hopper walls in the hopper funnel and communicating with the hopper interior, each of the plurality of wall junction crevices defining an animal feed flow path communicating with the feed dispensing opening in the hopper interior;

a pair of spaced-apart damper flaps disposed in the hopper interior; and a damper flap opening formed by the pair of spaced-apart damper flaps;

a feed dispensing assembly disposed in communication with the damper flap opening of the teed hopper, the feed dispensing assembly including:

a feed dispensing wheel having a plurality of wheel blades:

a drive shat drivingly engaging the feed dispensing wheel; and a wheel drive assembly drivingly engaging the drive shaft for rotation; and at least one hopper vibrator disposed in the hopper interior in the animal feed flow path of at least one of the plurality of wall junction crevices and in mechanical engagement with the plurality of hopper walls, whereby the at least one hopper vibrator is operable to impart vibration to the feed hopper and to contact, agitate and break up the animal feed such that flow of the animal feed from the hopper interior through the feed dispensing opening of the feeder hopper is enhanced.

* * * * *